March 8, 1966  G. C. PRICE ETAL  3,239,183
POLE MOUNTING BRACKET
Filed Jan. 28, 1964  4 Sheets-Sheet 1
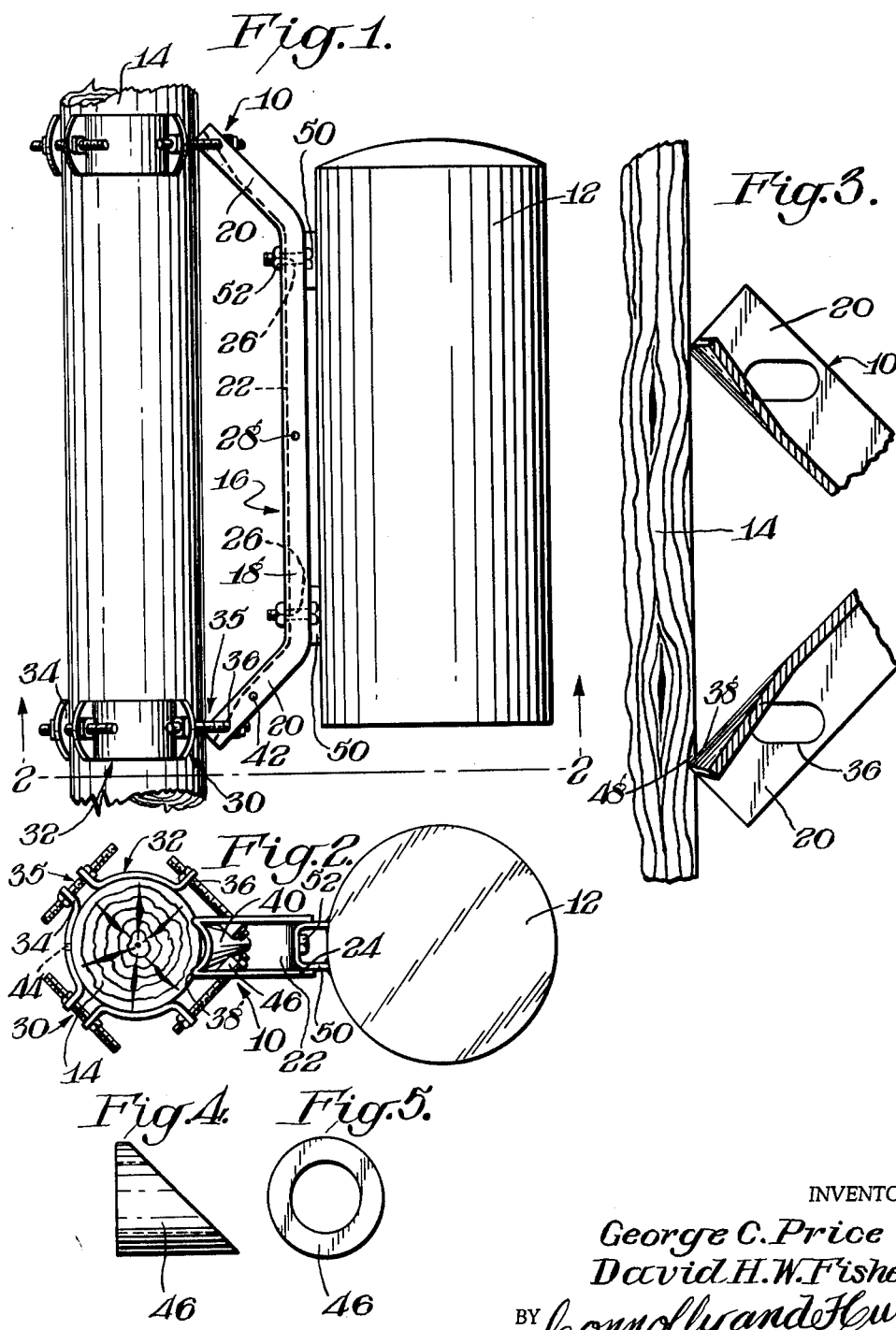
INVENTORS
George C. Price
David H. W. Fisher
BY Connolly and Hutz
ATTORNEYS INVENTORS
George C. Price
David H. W. Fisher
BY Connolly and Hutz
ATTORNEYS

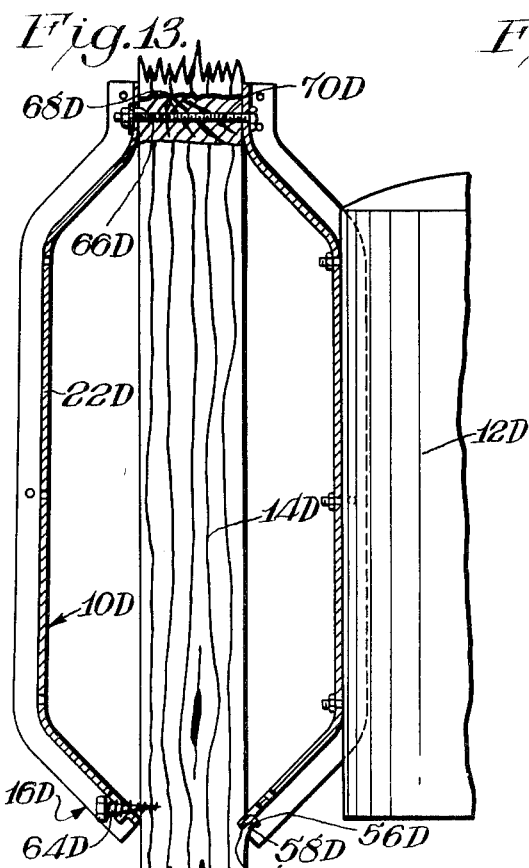
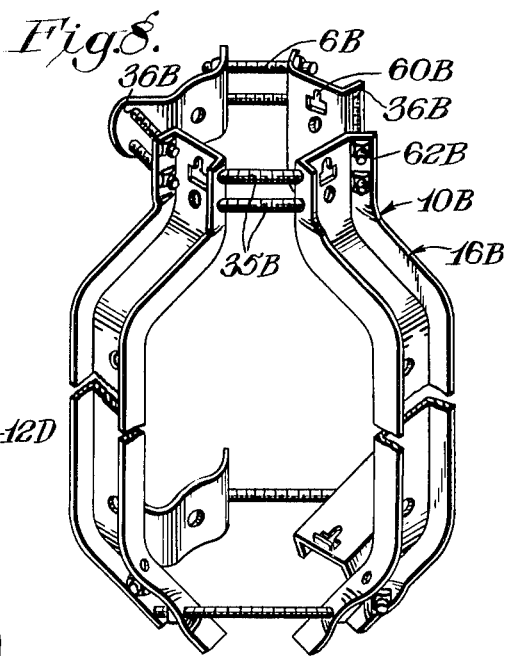
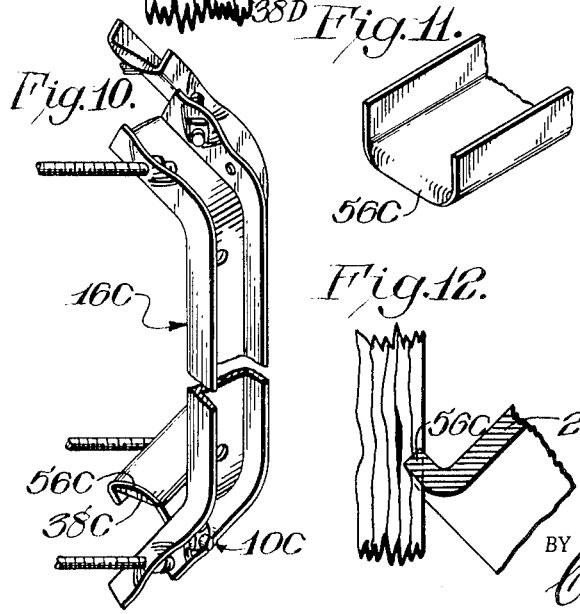
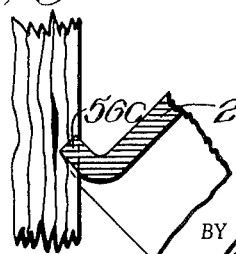
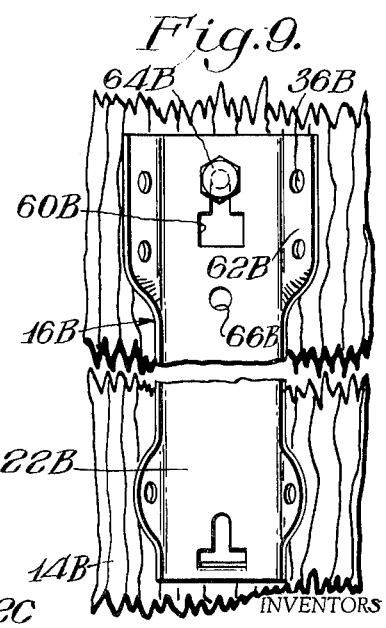
INVENTORS
George C. Price
David H.W. Fisher
BY Connolly and Hutz
ATTORNEYS March 8, 1966 G. C. PRICE ETAL 3,239,183
POLE MOUNTING BRACKET
Filed Jan. 28, 1964 4 Sheets-Sheet 4

INVENTORS
George C. Price &
David H. W. Fisher
BY Connolly and Hutz
ATTORNEYS

United States Patent Office 3,239,183
Patented Mar. 8, 1966

3,239,183
POLE MOUNTING BRACKET
George C. Price and David H. W. Fisher, Battle Creek Township, Calhoun County, Mich., assignors to Oliver Electrical Manufacturing Company, Battle Creek, Mich., a corporation of Delaware
Filed Jan. 28, 1964, Ser. No. 340,650
19 Claims. (Cl. 248—230)

This application is a continuation-in-part of copending application Serial No. 264,395, filed March 11, 1963, now abandoned.

This invention relates to a bracket for mounting a heavy object upon a pole, and it more particularly relates to such a bracket for mounting a transformer upon a pole.

An object of this invention is to provide a simple, dependable and economical bracket for mounting a heavy object such as a transformer upon a pole.

Another object is to provide a form of such a bracket that reacts to engage the pole in a self-supporting manner under load.

In accordance with this invention a bracket for mounting a heavy object such as a transformer upon a pole essentially comprises an elongated arch-shaped structural section. When this section is hung upon a pole in a vertical position with its upper end engaged with it, its intermediate portion laterally spaces the object from the pole; and when it is loaded for example by hanging a transformer upon its intermediate portion, the reaction of the section under the downward pull of the weight causes the bottom edge of the lower end of the section to dig into the pole to help support the section and prevent it from sliding downwardly.

The connecting means for engaging the upper end of the section to the pole may be provided for example by pole bands or through bolts. The lower end may be left free of lateral restraining members and its digging action depended upon to keep it in position, or various degrees of auxiliary lateral restraint can be provided such as by a vertically-slotted screw connection to the pole or pole band means. The pole contact edge on the lower end of the section can be prevented from cutting too far into the pole under heavy loads and weakening it by diverting it or a tab on or adjacent it away from the line of action of the load.

When both ends of the section are made similar to each other with a pole contact edge at each end, the bracket is vertically reversible. It may be extremely simply and economically fabricated from a channel section having a straight intermediate portion and a pair of legs disposed inwardly at obtuse angles to it. Holes for pole band studs are provided in the sides of the channel adjacent both ends of the legs, and a portion of these sides in the vicinity of the holes is outwardly deformed to provide a flat contact surface for the stud bolts. Tabs bent outwardly from the central area of both ends of the webs a short distance from the pole contact edges engage the top surface of any chips peeled out of the surface of the pole by the digging action of the bottom edge under load to vertically anchor the digging edge upon the pole after it has penetrated sufficiently to prevent the assembly from sliding downwardly under maximum load conditions. This prevents heavy loads from digging the contact edge so far into the pole that it gouges large chips out of the pole and unduly weakens it.

Novel features and advantages of the present invention will become apparent to one skilled in the art from a reading of the following description in conjunction with the accompanying drawings wherein similar reference characters refer to similar parts and in which:

FIG. 1 is a side view in elevation of one embodiment of this invention mounted upon a pole;

FIG. 2 is a cross-sectional view taken through FIG. 1 along the line 2—2;

FIG. 3 is a diagrammatic side elevational view of top and bottom portions of the bracket shown in FIG. 1 in conjunction with portions of the pole engaged thereby;

FIGS. 4 and 5 are respectively side and end views of a washer shown in FIGS. 1, 2 and 3;

FIG. 8 is a three-dimensional view similar to FIG. 6 of a cluster of brackets which are a further embodiment of this invention;

FIG. 9 is a front view in elevation of one of the brackets shown in FIG. 8 in an initial phase of mounting upon a pole;

FIG. 10 is a partial three-dimensional view of a cluster of brackets which are a still further embodiment of this invention;

FIG. 11 is a three-dimensional view of an end portion of one of the brackets shown in FIG. 10;

FIG. 12 is a cross-sectional view of a lower end portion of one of the brackets shown in FIGS. 10 and 11 as it reacts under a load relative to a pole;

FIG. 13 is a cross-sectional view in elevation of a pair of brackets similar to the type shown in FIG. 8 mounted upon a pole by a through bolt;

In FIGS. 1 and 2 is shown a bracket 10 for mounting a heavy object such as a transformer 12 upon a pole 14, which is for example a conventional wooden pole of the type used for supporting electrical distribution lines. Transformer 12 is for example one of the heaviest types of transformers in current use, and weighing fifteen hundred pounds.

The principal component of bracket 10 is an elongated arch-shaped structural section 16 fabricated for example from a structural channel made of a hot dipped galvanized steel with illustrative thickness, side flanges and web dimensions of 9/16 x 1¼ x 4 inches.

Figure 6:
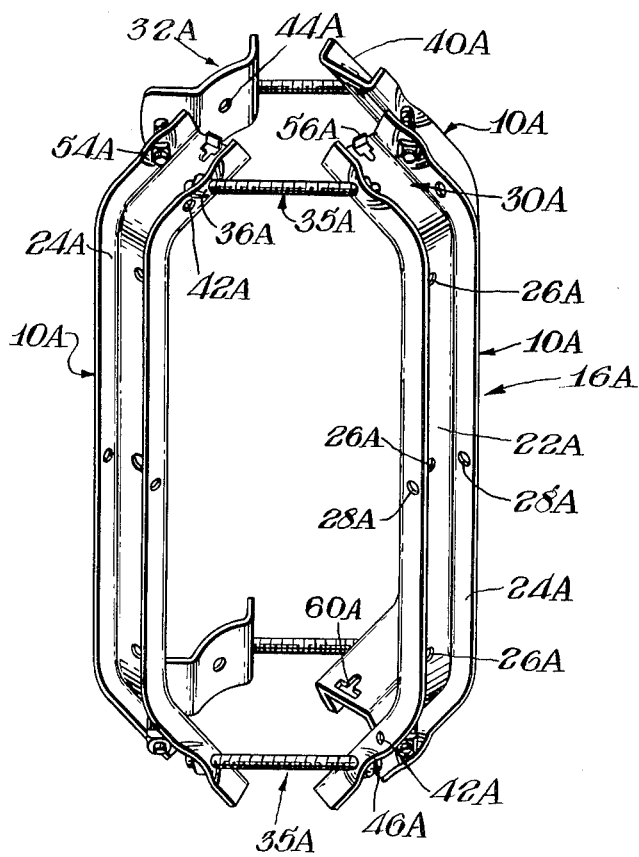
FIG. 6 is a three-dimensional view of a cluster of brackets which are another embodiment of this invention.

Section 16 for example includes an intermediate portion 18 laterally spaced from pole 14 by a pair of legs 20 disposed at obtuse angles to intermediate portion 18 by being bent inwardly away from web 22. FIG. 2 illustrates the relationship of web 22 and side flanges 24 of section 16, and FIG. 1 shows vertically-spaced holes 26 in web 22 which provides means for connecting an object such as transformer 12 to section 16. Vertically-spaced holes 26 provide both twelve and twenty-four inch spacing for transformer mounting to accommodate all sizes of standard pole mounted transformers. Holes 28 in side flanges 24 can be used for connecting sway braces (not shown) between a cluster of sections 16 as shown in FIG. 6.

In FIG. 1 section 16 is connected to pole 14 by pole band connecting means 30 including arcuate straps 32 having outwardly bend ends 34 which are connected to each other and to side flanges 24 of channel section 16 by stud bolt and nut assemblies 35 extending through pole band connecting slots 36 in the ends of legs 20 of section 16. Mounting hole 44 is included in strap 32 for hanging a bracket assembly upon a pole by a lag screw inserted through it to facilitate assembly of parts upon the pole.

The ends of section 16 are provided with the substantially sharp pole contact points 38 at the backs of the junctions of web 22 with side flanges 24 which are left protruding by arcuate identations 40 formed in the ends of web 22. Section 16 is reversible because legs 20 are identically formed, and it also includes ground lug holes 42 in side flanges 24. FIG. 1 shows a single section 16 and three arcuate straps 32 for attaching section 16 to the pole. With the illustrated connecting bolts and straps, up to four sections 16 can be assembled in a cluster about conventional utility poles, but three or two are most commonly employed.

Nut and steel bolt assemblies 35 include beveled washers 46 for snugly engaging them with the side flanges 24 of a section 16 mounted upon a pole, and beveled washers 46 are illustrated in FIGS. 4 and 5. These washers can be eliminated by forming the ends of the channel sides to squarely engage the nut and bolt assemblies themselves as later described.

FIG. 3 discloses the reaction that occurs when a loaded transformer bracket 10 carrying a transformer 12 is secured to a pole 14. The weight of transformer 12 rotates channels 16 outwardly about the lower set of stud bolt and nut assemblies 35, which causes the lower contact edges 38 at the bottom of section 16 to dig into the pole and form slight indentations 48 which prevent the assembly from sliding down the pole. At the same time the top end of section 16 illustrated at the top of FIG. 3 tends to pull away from the pole a very slight amount to the extent permitted by the upper set of stud bolt and nut assemblies 35. This digging action occurs even when a pair of sections 16 are oppositely disposed, and a special form of the ends of channel section 16 (later described) causes the lower end to dig into the pole under light loads sufficiently to prevent downward movement yet prevents digging in too deeply under heavier loads up to five thousand pounds and even more.

Such heavier loads are encountered when the newer high-capacity types of units are mounted upon section 16, and these heavier loads may be accommodated by employing the controlled digging action described in the previous paragraph and also by using heavier cross sections or stronger materials or both. The illustrated type of section adequately supports loads up to five thousand pounds and more with little distortion and practically no permanent deformation after the load is removed. Such sections can be made in shapes which provide extensions from the pole face of six, nine, and fourteen inches or other extensions to satisfy all existing specifications and requirements for transformer mounting on poles. The pole face extension is for example measured from the pole to the inside of the straight intermediate portion 18 of section 16.

As shown in FIGS. 1 and 2, transformers 12 are securely bolted to the twelve or twenty-four inch spaced transformer mounting holes 26 on web 22 to accommodate standard twelve and twenty-four inch spacings of standard transformer mounting brackets 50, which are connected to holes 26 by transformer mounting bolt and nut assemblies 52.

In FIG. 6 is shown a cluster of three brackets 10A and upper and lower straps 32A which are all joined together by nut and bolt assemblies 35A for mounting about a pole 14A, not shown, in a manner similar to that described in FIG. 1. The three brackets 10A provide means for supporting three transformers about pole 14A, and even a fourth bracket might be added if it is desired to mount four transformers upon a pole. Brackets 10A differ from brackets 10 in several respects. Portions 54A of side flanges 24A adjacent connecting stud bolt holes 36A are outwardly deformed to provide flat contact for the nuts on nut and stud assemblies 35A without requiring any special washers 46, as shown in FIGS. 4 and 5, when assembled about a pole.

Figure 7:
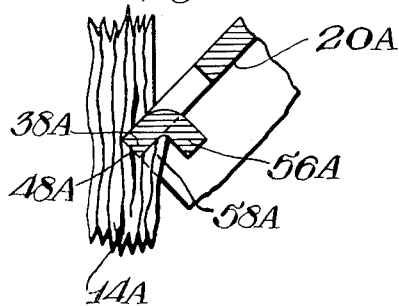
FIG. 7 is an enlarged cross-sectional view of a lower end portion of one of the brackets shown in FIG. 6 as it reacts relative to a pole under load.
Figure 14:
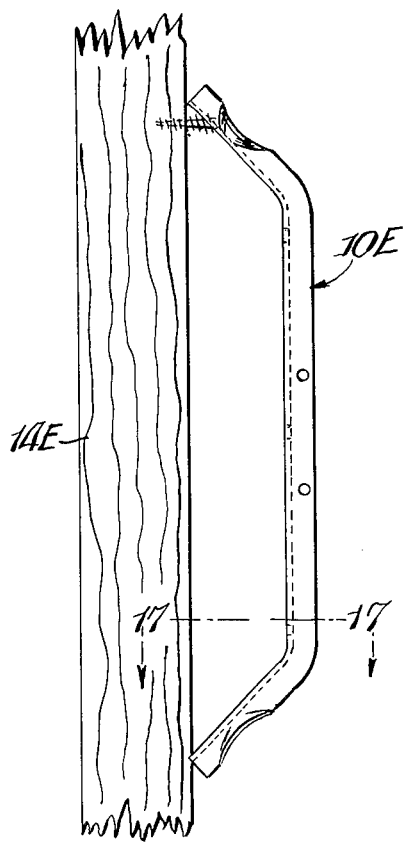
FIG. 14 is a side view in elevation of a further embodiment of this invention mounted on a pole.
Figure 15:
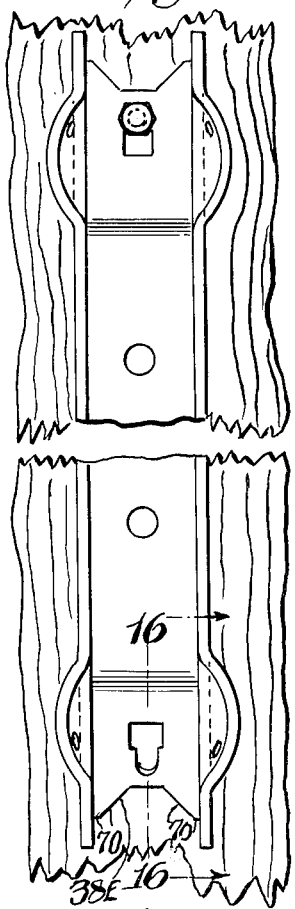
FIG. 15 is a front view in elevation of the embodiment of the invention shown in FIG. 14.

Tabs 56A near contact edges 38A at the ends of sections 16A are diverted away from the line of action of sections 16A under load to provide holding areas which prevent contact edges 38A from biting too deeply into pole 14A under relatively heavy loads. As shown in FIG. 7, tabs 56A bent outwardly from the central area of both ends of webs 22A a short distance from pole contact edges 38A engage the top surfaces of any chips 58A peeled or dug out of the surface of the pole by the digging action of bottom edge 38A under load. This vertically anchors section 16A upon the pole after its digging edge 38A has penetrated sufficiently to prevent the assembly from sliding downwardly under load. This prevents heavy loads from digging contact edge 38A so far into the pole that it gouges a large chip out of it and unduly weakens the pole. As shown in FIG. 6, tabs 56A are for example conveniently bent out of doghouse-shaped hole 60A whose slotted portion is utilized for insertion of a lag screw for preliminarily hanging brackets 10A as later described in conjunction with FIG. 13.

Brackets 10B shown in FIGS. 8 and 9 are similar to brackets 10A shown in FIG. 6 and act similarly under load as described in FIG. 7. However, brackets 10B are not vertically reversible as are brackets 10A because the upper ends 62B of brackets 10B are vertically elongated to include an upper portion 62B disposed substantially parallel to the pole to give it sufficient area to include a pair of connecting bolt holes 36B vertically spaced from each other for accommodating a pair of nut and stud assemblies 35B to anchor the upper portion 62B to a pole. This provides additional securing action for the upper portion of the brackets when particularly heavy transformers such as those weighing in the neighborhood of 5,000 lbs. are mounted upon bracket 10B.

FIG. 9 shows one of brackets sections 16B temporarily hung in a preliminary stage of mounting upon pole 14B by lag screw 64B inserted through the narrow slotted portion of key hole slot 60B. Section 16B is conveniently maintained in position thereby for securing upon pole 14B. In FIGS. 8 and 9 is also shown an installation hole 66B through web 22B adjacent key hole slot 60B. Hole 66B permits mounting by means of a through bolt as later discussed in conjunction with FIG. 13.

In FIGS. 10–12 is shown a bracket 10C which is similar to bracket 10A with the exception that an extension 56C of contact edge 36C is bent outwardly to provide an anchoring area diverted away from the line of action of the load. Its action on a pole is illustrated in FIG. 12 which shows how extended end 56C of web 22C bites upwardly into the pole to anchor the bracket vertically upon it under load and to prevent it from digging too far into the pole when particularly heavy loads are mounted upon section 16C.

In FIG. 13 are shown a pair of brackets 10D mounted upon a pole 14D by a through bolt 68D inserted through holes 66D in webs 22D. A hole 70D is drilled through pole 14D for insertion of through bolt 68D. Sections 16D in FIG. 13 are in all respects other than mounting similar to sections 16B shown in FIG. 8, and bottom contact edges 38D are vertically anchored upon pole 14D by outwardly diverted tabs 56D which engage the tops of any chips 58D peeled from the pole by the reaction of the lower end of section 16D under the load imposed by transformer 12D. The vertical anchoring action is substantially identical to that described in FIG. 7 which causes the lower end of the bracket to be vertically anchored upon the pole under the reaction of the weight imposed by a transformer 12D which causes lower edge 38D to dig into the pole and be vertically anchored thereon by the anchoring action of diverted tab 56D. The bottom end of section 16D at the left-hand side of FIG. 13 upon which a transformer has not as yet been mounted, is not dug into and vertically anchored upon the pole. FIG. 13 thus illustrates the condition of bottom edge 38D before and after loading. Lag screw 64D inserted through the elongated portion of key hole slot 66D laterally guides the lower end of section 16D before load is imposed upon it to maintain the section vertically disposed upon pole 14D. After load is imposed, as shown in the right-hand side of FIG. 13, the digging action of bracket 10D itself maintains it vertically oriented without any auxiliary guiding means.

Figure 16:
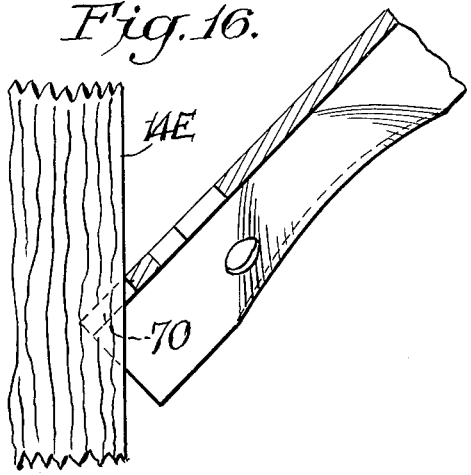
FIG. 16 is a cross-sectional view through FIG. 15 along the line 16—16.
Figure 17:
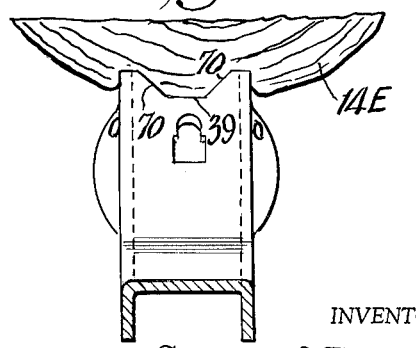
FIG. 17 is a cross-sectional view through FIG. 14 along the line 17—17.

In FIGS. 14–17 are shown a bracket 10E mounted upon a pole 14E. Bracket 10E is similar to bracket 10A with the exception that the contact edge 38E is notched having a pair of tapered digging legs 70 and a limit edge 39 as most clearly shown in FIGS. 15 and 17. As shown in FIGS. 16 and 17 when bracket 10E is under load it rotates so that legs 70 dig into pole 14E to firmly anchor bracket 10E upon the pole and thus prevent it from slipping down the pole. Limit edge 39, however, prevents contact edge 38E from digging too deeply into the pole and thereby unduly weakening it. Bracket 10E is not only effective under light loading such as with transformers weighing less than 500 pounds but is also particularly effective with heavy transformers since limit edge 39 prevents the bracket from digging too deeply into the pole.

What is claimed is:

1. A bracket for mounting a heavy object such as a transformer upon a pole comprising an elongated arch-shaped single piece channel section for vertical disposition upon and with the web adjacent a pole and its upper and lower ends in contact with the surface of a pole and the intermediate portion of said section laterally spaced from a pole, object connecting means disposed in vertically spaced relationship upon said intermediate portion of said section, pole connecting means upon said upper end of said section, said bracket being symmetrical with said lower end and said upper end of said section being directed at the same obtuse angle to said intermediate portion with said lower end terminating in a bottom edge which is also directed at said obtuse angle to said intermediate portion whereby a component of force from a vertically mounted heavy object is transmitted through said lower end and to said bottom edge, and said bottom edge of said lower end constituting digging means for causing said bottom edge to dig into a pole in response to the reaction of said section under load when said upper end of said section is connected to said pole by a pole connecting means and when an object is connected to said vertically disposed section for helping support and prevent said loaded section from sliding down a pole.

2. A bracket as set forth in claim 1 wherein said pole connecting means comprises pole band connecting means provided at both ends of said section.

3. A bracket as set forth in claim 1 wherein said bottom edge includes an area diverted away from the line of action of said load toward a pole to prevent said edge from biting too deeply into a pole under a relatively heavy load.

4. A bracket as set forth in claim 1 wherein said pole connecting means comprises a hole in the central portion of the upper end of said section for insertion of a through bolt whereby the upper end of said section is hung upon a pole and a slot being provided in the lower end of said section for laterally guiding it to maintain said section vertically disposed upon a pole.

5. A bracket as set forth in claim 1 wherein said bottom edge is notched in its central portion to prevent said bracket from digging too deeply into a pole.

6. A bracket as set forth in claim 5 wherein said bottom edge tapers from adjacent its ends inwardly toward its central portion to provide a pair of legs which are adapted to dig into a pole, the space between said legs comprising said notch.

7. A bracket as set forth in claim 6 wherein a limit edge connects said legs for preventing said bracket from digging too deeply into a pole.

8. A bracket for mounting a heavy object such as a transformer upon a pole comprising an elongated arch-shaped structural section for vertical disposition upon a pole with its ends in contact with the surface of a pole and the intermediate portion of said section laterally spaced from a pole, object connecting means disposed in vertically spaced relationship upon said intermediate portion of said section, pole connecting means upon the upper end of said section, a contact edge upon the lower one of said ends which is directed at an angle to the surface of a pole which causes the reaction of said section under load to dig it into a pole when the upper end of said section is connected to a pole by said pole connecting means when an object is connected to said vertically disposed section for helping support and prevent said loaded section from sliding down a pole, and wherein said arch-shaped section being an arch-shaped channel having a web inwardly disposed and a pair of outwardly disposed side flanges.

9. A bracket as set forth in claim 8 wherein said object and said pole connecting means respectively comprise holes in said web for connecting an object and holes in said side flanges for connecting pole band studs and bolts.

10. A bracket as set forth in claim 9 wherein said pole band stud and bolt holes are provided in said side flanges adjacent both ends of said section.

11. A bracket as set forth in claim 9 wherein the portions of said side flanges including said holes are deformed outwardly to provide a square contact surface for said pole band bolts.

12. A bracket as set forth in claim 8 wherein indentations are disposed in the ends of said web to comprise the backs of the junctions of said web with said flanges at said contact edge.

13. A bracket as set forth in claim 8 wherein a tab extends inwardly from said web into said channel a short distance from said contact edge for engaging any chips peeled outwardly from a pole by said contact edge to prevent said contact edge from biting too deeply into a pole.

14. A bracket as set forth in claim 13 wherein said tab extends inwardly from central portions of said web.

15. A bracket as set forth in claim 13 wherein said tabs are provided on both ends of said web to make said bracket vertically reversible.

16. A bracket as set forth in claim 8 wherein the end of said web is bent outwardly to provide an area diverted away from the line of action of said load toward a pole for preventing said contact edge from biting too deeply into a pole under load.

17. A bracket for mounting a heavy object such as a transformer upon a pole comprising an elongated arch-shaped structural section for vertical disposition upon a pole with its ends in contact with the surface of a pole and the intermediate portion of said section laterally spaced from a pole, object connecting means disposed in vertically spaced relationship upon said intermediate portion of said section, pole connecting means upon the upper end of said section, a contact edge upon the lower one of said ends which is directed at an angle to the surface of a pole which causes the reaction of said section under load to dig it into a pole when the upper end of said section is connected to a pole by said pole connecting means when an object is connected to said vertically disposed section for helping support and prevent said loaded section from sliding down a pole, said arch-shaped section comprising a substantially straight intermediate portion and a pair of substantially straight legs disposed at obtuse angles to said intermediate portion, said arch-shaped section being an arch-shaped channel having a web inwardly disposed and a pair of outwardly disposed side flanges, said pole connecting means comprises holes in both ends of said side flanges for pole band studs, the upper end of said section having an extreme upper portion disposed substantially parallel to a pole, and a pair of said holes being provided in each of said side flanges in said extreme upper portion for connecting a pair of pole band studs thereto.

18. A bracket for mounting a heavy object such as a transformer upon a pole comprising an elongated arch-shaped single piece channel section for vertical disposition upon and with the web adjacent a pole and its upper and lower ends in contact with the surface of said pole and the intermediate portion of said section laterally spaced from a pole, object connecting means upon said intermediate portion of said section for securing an object thereto, pole connecting means upon said upper end of said section, means upon said lower end of said section for permitting vertical movement of said lower end and for restraining lateral movement of said lower end, said bracket being symmetrical with said lower end and said upper end of said section being directed at the same obtuse angle to said intermediate portion with said lower end terminating in a bottom edge which is also directed at said obtuse angle to said intermediate portion whereby a component of force from a vertically mounted heavy object is transmitted through said lower end and to said bottom edge, said bottom edge of said lower end thereby comprising digging means for causing said bottom edge to dig into a pole in response to the reaction to said section under load when said upper end of said section is connected to a pole by said pole connecting means and when an object is connected to said vertically disposed section for helping support and prevent said loaded section from sliding down a pole.

19. A bracket for mounting a heavy object such as a transformer upon a pole comprising an elongated arch-shaped substantially rigid structural section of sufficient strength to resist material bending for vertical disposition upon a pole, with its upper and lower ends to be in contact with the surface of a pole and the intermediate portion of said section laterally spaced from a pole, object connecting means disposed in vertically spaced relationship upon said intermediate portion of said section, pole connecting means upon said upper end of said section, said lower end being substantially entirely directed at an obtuse angle to said intermediate portion and terminating in a bottom edge disposed remote from said intermediate portion whereby a component of force from a vertically mounted heavy object is transmitted through said lower end and to said bottom edge, and said bottom edge of said lower end constituting digging means for causing said bottom edge to dig into a pole in response to the reaction of said section under load when said upper end of said section is connected to a pole by said pole connecting means and when an object is connected to said vertically disposed section for helping support and prevent said loaded section from sliding down a pole.

References Cited by the Examiner
UNITED STATES PATENTS

| | | | |
|---|---|---|---|
| 1,812,203 | 6/1931 | Gaskill | 248—221 |
| 2,512,174 | 6/1950 | Reeder | 248—221 |
| 2,662,714 | 12/1953 | Jenne | 248—221 |
| 2,855,980 | 10/1958 | Konieczka | 248—221 |
| 2,879,964 | 3/1959 | Anderson | 248—221 |
| 2,910,261 | 10/1959 | Ward | 248—230 |
| 2,996,277 | 8/1961 | Hoffman | 248—221 |

CLAUDE A. LE ROY, *Primary Examiner.*